UNITED STATES PATENT OFFICE 2,516,508

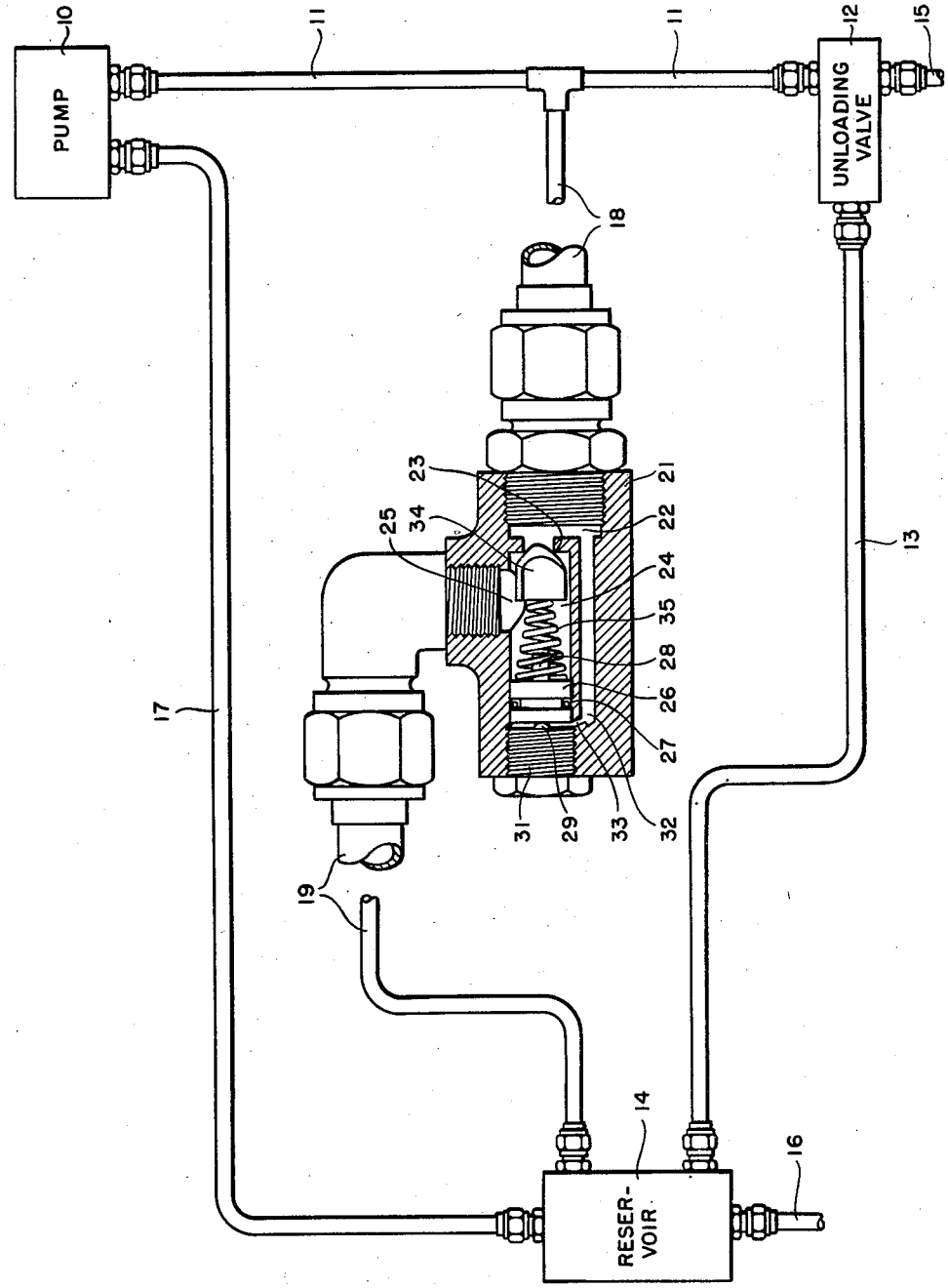

HYDRAULIC SYSTEM AND VALVE THEREFOR

Verne P. Donner, Palatine, Ill., assignor to Curtiss-Wright Corporation, a corporation of Delaware Application December 26, 1946, Serial No. 718,579

1 Claim. (Cl. 103—42)

This invention relates to hydraulic systems such as those presently employed in aircraft and to an improved valve means for avoiding or substantially reducing shocks which occur in such systems.

The hydraulic system may include a reservoir, a constant displacement engine driven pump receiving fluid from the reservoir, and an unloading valve in the outlet line from the pump for directing fluid to the operated portion of the system or returning it directly to the reservoir. The unloading valve may function in response to pressure changes in the operated portion of the system. When the valve directs liquid flow directly into the reservoir, the load on pump is small, and when the valve suddenly shuts off this flow and directs the fluid into the system, heavy shock loads are imposed upon the pump, piping, fittings, and unloading valve.

These shock loads, which persist for only short periods of time, may impose upon the system pressures at least several times as great as the normal operating pressures, and they require that the various components of the system be made much heavier than otherwise would be necessary. Likewise they impose undue wear on the moving parts, increase the frequency of breakdown and leakage of seals and packings, and are otherwise disadvantageous.

The present invention provides in such a system a shock dissipating valve that is adapted to by-pass fluid from the pump to the reservoir around the unloading valve when shock loads occur. The valve is so arranged as to open upon a surge in the pressure in the pump outlet line, and thereafter to close gradually even though the pressure remains high. Thus no pressure limits are placed upon the system, as occurs in the case of a conventional pressure relief valve, but undue stresses imposed by sudden operation of the unloading valve are avoided.

The foregoing and other objects and advantages will become apparent from the following description of a typical embodiment of the invention.

In the accompanying drawing the shock valve is shown in longitudinal section, and the other parts of the system are shown diagrammatically.

As shown the system includes a positive displacement pump 10 which may be driven by an engine at relatively constant speed, so that the volume of liquid discharged from the pump through conduit 11 does not vary appreciably with pressure changes in the system. Liquid from conduit 11 is directed by an unloading valve 12 either through a conduit 13 directly to a reservoir 14 or through a conduit 15 to one or more fluid operated devices which may comprise actuators for the airplane wing flaps, retractable landing gear, or other accessories. Return flow of fluid, if there is return flow from the type of device being operated, may be through conduit 16 into the reservoir. From the latter the fluid passes through conduit 17 to the inlet side of pump 10. A check valve (not shown) may be placed in the line 15 in order to prevent retrograde flow of liquid when the pressure in lines 11 and 13 drops below that in line 15, thus maintaining pressure in the operated portion of the system.

The shock valve of the present invention is arranged between conduit sections 18 and 19 which are respectively connected to conduit 11 and to the reservoir 14, and constitute a by-pass around the unloading valve 12. The shock valve comprises a body 21 with an inlet passage 22 communicating with conduit 18 and opening through a valve seat 23 into a cylindrical valve chamber 24. From a side wall of the latter opens the outlet passage 25 which communicates with conduit 19. A piston 26 slidable in the cylinder preferably is provided with a sealing ring 27 and a stem 28 projecting from one face toward the valve seat 23. The opposite face of the piston is spaced from the adjacent end of the cylinder by a projection 29 on a threaded plug 31 which may constitute an end wall of the cylinder. Inlet passage 22 communicates with the last-mentioned end of the cylinder through passages 32 and 33, the latter being suitably restricted for the mode of operation hereinafter described.

For closing against the valve seat 23 a plug type valve member 34 is provided. This member preferably has a rounded nose for engaging the seat and a body portion of generally triangular cross-section which is favorable to passage of liquid thereby when the valve member is unseated. The valve member 34 is normally held seated by a compression spring 35 of helical form which is disposed between member 34 and piston 26.

So long as the pressure in conduit 11 remains constant or recedes, the valve member 34 will remain closed against its seat 23. The area of piston 26 is somewhat larger than the area of member 34 exposed to pressure of fluid in inlet chamber 22, and spring 35 is therefore compressed sufficiently by the piston to hold the valve closed. However, upon the occurrence of a surge of pressure in line 11, the member 34 may be forced from its seat against the further compression of spring 35, thereby allowing fluid to pass from line 11 to the reservoir and thus relieving the pressure. While this is happening, the same fluid pressure in inlet passage 22 is acting through the metering passage 33 against the outer face of the piston. Consequently as fluid gradually accumulates behind the piston, the latter, acting through the spring 35, moves the valve member 34 to seated position.

It will be understood that the assembly acts as a relief valve whose relief pressure setting increases gradually until no relief exists. At this time the pressure in passage 11 and upon unloading valve 12 has gradually increased to the point where fluid may enter conduit 15 to build up the pressure in the operated portion of the system.

It will be noted that the shock valve has only two moving parts, 26 and 34, in addition to the spring 35. Failure of the spring will not cause malfunctioning of the system as a whole, since in such case the stem 28 of plunger 26 will hold valve member 34 seated at all times when pressure exists in lines 11, 18. In normal operation the stem 28 constitutes a spacing means which prevents the piston from moving to a position wherein it would shut off or substantially throttle the outlet 25.

The specific system and shock valve structure herein illustrated and described represent only one embodiment of the invention, and it will be understood that the principles involved may be incorporated in other arrangements without departing from the spirit of the invention or from the scope of the appended claim.

I claim:

In an hydraulic system, a positive displacement pump, a reservoir communicating with the pump inlet, and an unloading valve arranged to direct fluid exhausting from the pump to a fluid pressure operated portion of the system or to return said fluid directly to said reservoir, a by-pass to the reservoir from a point between the pump outlet and said unloading valve, a valve chamber in said by-pass with the inlet thereof opening through a valve seat, a valve member in the chamber adapted to close upon said seat to shut off flow through said by-pass, a piston in said chamber of larger effective area than the valve member, a spring effective between the piston and the valve member for urging the latter toward the seat, and a metering passage from a point in the system on the inlet side of the seat for directing fluid against the piston for urging it in a direction to seat the valve member, said valve member opening in response to pressure surges of predetermined magnitude in the system downstream from the pump when the unloading valve shuts off return of fluid directly to the reservoir, and said valve member subsequent to such opening being closed gradually as fluid passes through said metering passage.

VERNE P. DONNER.

REFERENCES CITED

The following references are of record in the file of this patent:

UNITED STATES PATENTS

| Number | Name | Date |
|---|---|---|
| 1,934,758 | Temple | Nov. 14, 1933 |
| 1,972,560 | Heller | Sept. 4, 1934 |
| 2,002,451 | Gray | May 21, 1935 |
| 2,316,445 | Marchall | Apr. 13, 1943 |